(No Model.)

W. J. RYCKMAN.
UNDERGROUND CONDUIT FOR ELECTRIC WIRES.

No. 307,872. Patented Nov. 11, 1884.

WITNESSES:
Jos. N. Rosenbaum.
Martin Petry.

INVENTOR
William J. Ryckman
Joseph Paegen
ATTORNEYS.

UNITED STATES PATENT OFFICE.

WILLIAM J. RYCKMAN, OF BROOKLYN, NEW YORK, ASSIGNOR OF ONE-HALF TO BENJAMIN LEWIS, OF SAME PLACE.

UNDERGROUND CONDUIT FOR ELECTRIC WIRES.

SPECIFICATION forming part of Letters Patent No. 307,872, dated November 11, 1884.

Application filed February 25, 1884. (No model.)

*To all whom it may concern:*

Be it known that I, WILLIAM J. RYCKMAN, of Brooklyn, in the county of Kings and State of New York, have invented certain new and useful Improvements in Underground Conduits for Electric Wires, of which the following is a specification.

This invention has reference to an improved underground conduit for electric wires; and it consists of an arched conduit, the side walls of which are formed of recessed bracket-bricks having one or more semicircular channels in their upper horizontal parts, and of tapering key-bricks of smaller size than the end recesses of the bracket-bricks, said key-bricks having semicircular channels in their under sides and seats that fit into recesses of the bracket-bricks so as to interlock therewith when placed in position thereon. The channels inclosed by the channels of the bracket and key bricks serve for the storage of electric cables of greater or less thickness, the smaller size being supported on yokes at the end of one bracket-brick and the next adjoining end of a key-brick. A curved recess in the end wall of the key-brick serves to insert a tool by which the key-brick may be removed from the recess of the bracket-brick or replaced therein.

Figure 1:
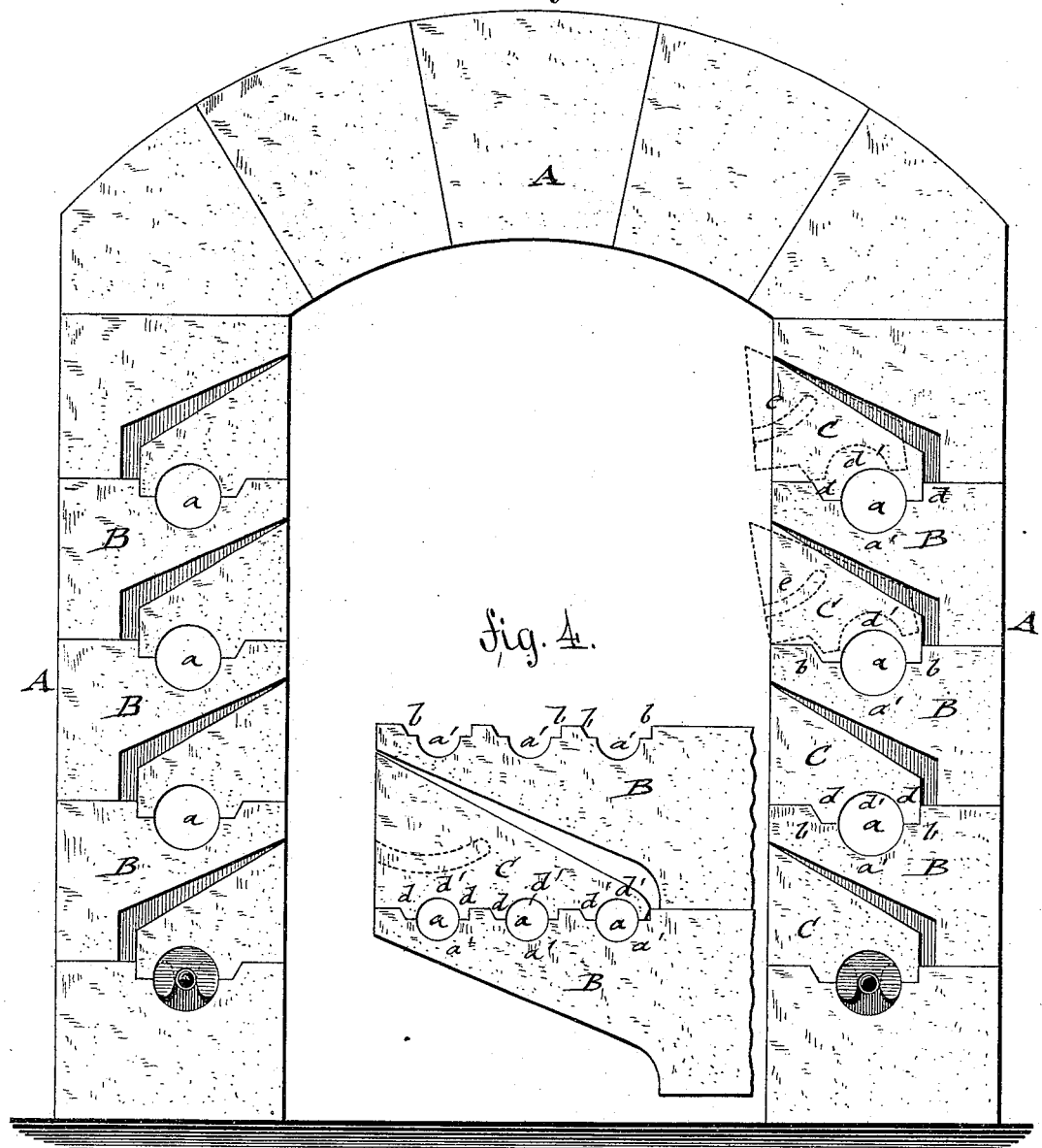
Figure 4:
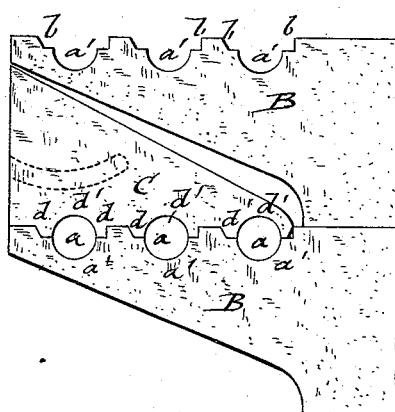
Figure 2:
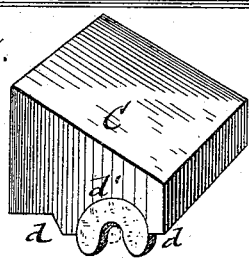
Figure 3:
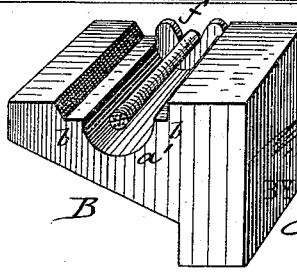

In the accompanying drawings, Figure 1 represents a vertical transverse section of an underground conduit for electric wires. Figs. 2 and 3 are perspective views, respectively, of a key-brick and a bracket-brick by which the cables are supported; and Fig. 4 is a detail side elevation of a bracket and key brick arranged for several cables.

Similar letters of reference indicate corresponding parts.

A in the drawings represents an arched underground conduit that is located below the level of the streets. The conduit is made of sufficient width and height to admit the convenient passage of the attendants, whereby the lines can be kept fully under control. The electric wires are preferably arranged in cables, which cables are supported in channels $a$, that are formed in the side walls of the conduit A. The side walls are made of different courses of bracket-bricks B and of interlocking key-bricks C. The bracket-bricks B have rectangular main parts and lateral brackets with tapering under side. Each bracket-brick B is provided with one or more horizontal recesses, $a'$ $a'$, and with depressions $b$ $b$ at both sides of the same. The key-bricks C fit into the space formed between the bracket-bricks, but they are made with a greater degree of inclination, so as to be smaller at one end than the same. The bottom of the key-bricks C is provided with projections $d$ $d$ at each side of an intermediate recess, $d'$, said projections fitting into the depressions or seats $b$ $b$ of the bracket-shaped bricks B, while the recesses $a'$ and $d'$ register and form the tubular channels $a$ $a$ for the storage of the cables. The face ends of the key-bricks are made wide enough to fill entirely the space between the ends of the bracket-bricks. As the key-bricks have a greater taper than the recesses between the bracket-shaped bricks, the former can be conveniently removed and replaced in position, as thereby sufficient clearance is obtained so that the depressions $d$ $d$ can be raised clear of the seats of the bracket-bricks. For this purpose the key-bricks C are provided with curved sockets $e$, extending from their faces inwardly, into which a correspondingly-shaped tool is inserted, by which the key-bricks can be taken hold of for being removed or replaced. If the cable required to be stored away in the channels of the bracket-bricks and key-bricks is smaller than the diameter of said channels, the bracket-bricks B are provided at one end with a V-shaped support or yoke, $f$, which is cemented into the recess $a'$ of the bracket-shaped brick, while the recess $d'$ of the key-brick next adjoining the yoke $f$ is provided with an inverted V-shaped support or yoke, $f'$, between which the cable is securely clasped so as to be firmly supported without being affected by the vibrations caused by the passage of heavy vehicles on the surface of the street. The surface of the semicircular recesses $a'$ and $d'$ of the bracket and key bricks, as well as the surface of the yokes, is glazed, so that they form proper non-conductors for the electric cables. If the electric wires are made up into cables of larger size, the bracket and key bricks are arranged with correspondingly-enlarged channels, while for cables of smaller size there are preferably more than one channel, arranged as shown in Fig. 4.

The advantages of my underground system of conducting electric wires are, first, that the wires are entirely protected against injury by moisture or otherwise; second, that repairs can be easily made at any point of the lines by removing the key-bricks, whereby access is given to the cable; third, that a large number of wires can be conducted in a comparatively inexpensive manner underground, dispensing with the poles and other objectionable supports above ground.

The bricks of the arch of the conduit may also be so arranged as conductors of electric wires, which feature I have described in a separate application for Letters Patent filed at the same time herewith.

Having thus described my invention, I claim as new and desire to secure by Letters Patent—

1. An underground conduit for electric wires, the side walls of which are formed of bracket-shaped bricks having one or more recesses at their top surface, and of interlocking key-bricks having bottom recesses registering with the recesses of the bracket-bricks, so as to form channels for the cables or wires, substantially as set forth.

2. A conduit for electric wires, the walls of which are composed of bracket-shaped bricks having recesses and depressions, and removable key-bricks having bottom recesses and projections interlocking with the depressions, substantially as set forth.

3. The combination of a series of bracket-shaped bricks having top recesses and depressions, with interlocking key-bricks having bottom recesses and projections, said key-bricks being of less width at the inner end than the space between bracket-bricks, so as to admit of their clearance of the projections when removing or inserting the key-bricks, substantially as specified.

4. In a conduit for electric wires, a key-brick of tapering shape, and provided with a recess in its bottom and interlocking shoulders at each side of the recess, substantially as described.

5. The combination of bracket-shaped supporting-bricks having recesses and seats, the recesses being provided with yokes, and key-bricks of tapering shape provided with bottom recesses and shoulders, and with inverted yokes at the ends next adjoining the yokes of the bracket-shaped bricks, substantially as and for the purpose set forth.

6. A bracket-shaped brick for holding electric wires, composed of a rectangular main portion and a tapering bracket, the surface of which is provided with one or more recesses for the wires and intermediate seats for the interlocking key-bricks, substantially as set forth.

In testimony that I claim the foregoing as my invention I have signed my name in the presence of two subscribing witnesses.

WM. J. RYCKMAN.

Witnesses:
PAUL GOEPEL,
SIDNEY MANN.